US010019292B2

(12) United States Patent
Kopetz et al.

(10) Patent No.: US 10,019,292 B2
(45) Date of Patent: Jul. 10, 2018

(54) METHOD FOR EXECUTING A COMPREHENSIVE REAL-TIME COMPUTER APPLICATION BY EXCHANGING TIME-TRIGGERED MESSAGES AMONG REAL-TIME SOFTWARE COMPONENTS

(71) Applicant: FTS Computertechnik GmbH, Vienna (AU)

(72) Inventors: Hermann Kopetz, Baden (AT); Stefan Poledna, Klosterneuburg (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 0 days.

(21) Appl. No.: 15/007,317

(22) Filed: Jan. 27, 2016

(65) Prior Publication Data
US 2017/0161116 A1    Jun. 8, 2017

(30) Foreign Application Priority Data
Dec. 2, 2015 (AT) .............................. A 51038/2015

(51) Int. Cl.
*G06F 9/50* (2006.01)
*G06F 9/455* (2018.01)
*G06F 9/48* (2006.01)

(52) U.S. Cl.
CPC ........ *G06F 9/5077* (2013.01); *G06F 9/45558* (2013.01); *G06F 9/4887* (2013.01); *G06F 2009/4557* (2013.01)

(58) Field of Classification Search
None
See application file for complete search history.

(56) References Cited

U.S. PATENT DOCUMENTS 5,551,047 A * 8/1996 Mori .................. G06F 11/1489
712/28
5,721,922 A * 2/1998 Dingwall ............ G06F 9/45537
348/E7.073
(Continued)

FOREIGN PATENT DOCUMENTS

WO    2002/079972 A2    10/2002
WO    2011/123877 A2    10/2011
(Continued)

OTHER PUBLICATIONS

European search report, Application No. 16201408.8, EPO (Year: 2017).*
(Continued)

*Primary Examiner* — Abu Ghaffari
(74) *Attorney, Agent, or Firm* — Eversheds Sutherland (US) LLP

(57) ABSTRACT

A method for executing a comprehensive real-time computer application including an application software including a description of functions on a distributed real-time computer system including sensors, actuators, computing nodes, and distributor units having access to a global time. The application software including a number of real-time software components (RTSWCs). When executed, the RTSWCs exchange information by time-triggered messages. Each RTSWC is allocated a time-triggered virtual machine TTVM, wherein, during a service interval SI, an operating system running on a computing node provides a TTVM realized on the computing node with protected access to the network resources and memory resources of the computing node assigned to the TTVM, and wherein, during the SI, a defined computing power for processing the RTSWCs running in the TTVM is allocated to the TTVM by the operating (Continued)

Figure 1:
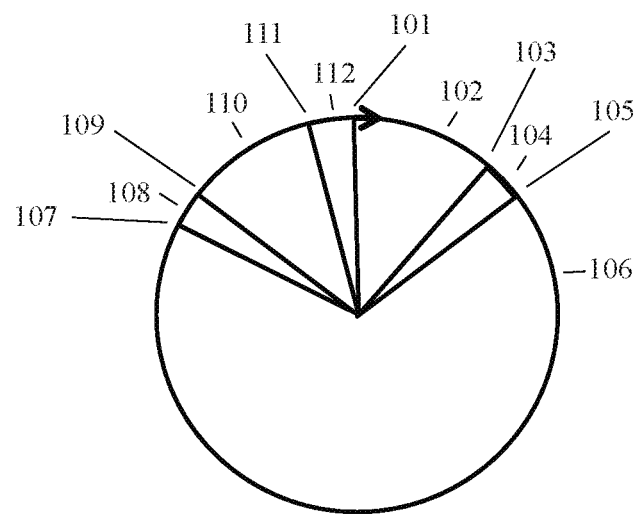

system of the computing node such that the RTSWCs provide a result before the end of the SI.

11 Claims, 3 Drawing Sheets

(56) References Cited

U.S. PATENT DOCUMENTS

| | | | | |
|---|---|---|---|---|
| 7,356,817 | B1* | 4/2008 | Cota-Robles | G06F 9/45537 710/262 |
| 9,699,085 | B2* | 7/2017 | Udupi | H04L 45/7453 |
| 2003/0115239 | A1* | 6/2003 | Togawa | G06F 1/324 718/102 |
| 2004/0268353 | A1* | 12/2004 | Kanai | G06F 9/4881 718/100 |
| 2005/0028160 | A1* | 2/2005 | Cofer | G06F 9/4881 718/100 |
| 2009/0287466 | A1* | 11/2009 | Klahold | G06F 9/4887 703/21 |
| 2009/0288084 | A1* | 11/2009 | Astete | G06F 9/45533 718/1 |
| 2010/0292979 | A1* | 11/2010 | Minot | G06F 17/5095 703/21 |
| 2012/0216193 | A1* | 8/2012 | Lee | G06F 9/45558 718/1 |
| 2013/0133580 | A1* | 5/2013 | Wright | C23C 16/45565 118/725 |
| 2013/0138271 | A1* | 5/2013 | Danielsson | H04L 67/322 701/3 |
| 2014/0137187 | A1* | 5/2014 | Kumar | G06F 21/00 726/3 |
| 2014/0282586 | A1* | 9/2014 | Shear | G06F 9/5072 718/104 |
| 2015/0003595 | A1* | 1/2015 | Yaghi | G06Q 10/063 379/85 |

FOREIGN PATENT DOCUMENTS

| | | |
|---|---|---|
| WO | 2013/096986 A2 | 7/2013 |
| WO | 2013/123543 A1 | 8/2013 |
| WO | 2013/138833 A1 | 9/2013 |
| WO | 2014/094023 A1 | 6/2014 |
| WO | 2014/186814 A1 | 11/2014 |
| WO | 2014/205467 A1 | 12/2014 |

OTHER PUBLICATIONS

Adaptive Fault Tolerance in Real Time Cloud Computing, Malik et al, 2011, IEEE, pp. 1-8 (Year: 2011).*
Cucinotta et al., "Providing Performance Guarantees to Virtual Machines Using Real-Time Scheduling", Euro-Par 2010 Workshops, LNCS 6586, 2011, pp. 657-664.
Kopetz, "Real-Time Systems: Design Principles for Distributed Embedded Application", Springer Science+Business Media, 2011, New York, USA.
Kopetz, In-Vehicle Real-Time Fog Computing, 2016 46th Annual IEEE/IFIP International Conference on Dependable Systems and Networks Workshops, IEEE, 2016, pp. 162-167.
Missimer et al., "Distributed Real-Time Fault Tolerance on a Virtualized Multi-Core System" OSPERT 2014—10th annual workshop on Operating Systems Platforms for Embedded Real-Time applications, 2014, pp. 17-23.
Tverdyshev et al, "PikeOS: End-to-End predictability for networked applications on multi-core avionics platforms" TecDay 2015—Multi-Core The challenge in avionics, 2015, pp. 1-24.
Embedded Systems Software Engineering Institute: 11 ESSEI TecDay 2015—Multi-Core The challenge in avionics, 2015 (3 pages).
Office Action issued in Austrian application No. 51038/2015, dated Jan. 25, 2016 (5 pages).
Duden. Emulation. URL w.duden.de/suchen/dudenonline/emulation.
Wikipedia. Virtualisierung. ://de.wikipedia.org/wiki/Virtualisierung_(Informatik).

* cited by examiner

METHOD FOR EXECUTING A COMPREHENSIVE REAL-TIME COMPUTER APPLICATION BY EXCHANGING TIME-TRIGGERED MESSAGES AMONG REAL-TIME SOFTWARE COMPONENTS

The invention relates to a method for realising a real-time computer application, in particular a comprehensive real-time computer application, on a distributed real-time computer system, which real-time computer system comprises a multiplicity of sensors, actuators, computing nodes and distributor units, and wherein the sensors, actuators, computing nodes and distributor units have access to a global time, and wherein a description of functions, in particular of the functions of the real-time computer application, in particular of the comprehensive real-time computer application, is contained in an application software.

In addition, the invention relates to a method for executing a real-time computer application, in particular a comprehensive real-time computer application, wherein a description of functions or of the functions of the real-time computer application is contained in an application software, or for executing an application software, which application software contains a description of functions or of the functions of the real-time computer application, in particular of the comprehensive real-time computer application, on a distributed real-time computer system, which real-time computer system comprises a multiplicity of sensors, actuators, computing nodes and distributor units, and wherein the sensors, actuators, computing nodes and distributor units have access to a global time.

The invention also relates to a computing node for a distributed real-time computer system, which real-time computer system comprises a plurality of sensors, actuators, computing nodes and distributor units, and wherein the sensors, actuators, computing nodes and distributor units have access to a global time, wherein a real-time computer application, in particular a comprehensive real-time computer application, or an application software is executed on the real-time computer system, wherein an application software or the application software contains a description of functions or of the functions of the real-time computer application.

The invention additionally relates to a distributed real-time computer system.

A cyber-physical system consists of a physical system which is controlled by a preferably distributed real-time computer system. The physical processes in the system are controlled by computing processes in the distributed real-time computer system.

A distributed real-time computer system consists of a process periphery for monitoring and controlling the physical processes in the system, a multiplicity of computing nodes with application software for processing the incoming data, and a communication system with communication channels and distributor units for transporting real-time messages between the process periphery and the computing nodes.

The process periphery consists of sensors, in particular intelligent sensors, and actuators, in particular intelligent actuators.

An intelligent sensor is a device that firstly converts the process data to be detected into a bit pattern. This bit pattern is checked for plausibility within the scope of the pre-processing and is converted into a physical measurand. The measurand is then sent in a message to receivers, in particular the interested receivers An intelligent actuator is a device which converts a target value received in a message into a physical variable at a predefined moment in time and thus influences the physical process in the physical system.

The object of the invention is to specify a solution as to how hardware/software interfaces can be introduced in a real-time computer system, in particular a comprehensive real-time computer system, the hardware/software interfaces enabling a systematic component-based system development on the one hand and it being possible for a runtime environment to be realised on the other hand, which meets the required real-time conditions and which can be modified and extended dynamically during running operation.

This object is achieved by means of the method and computing nodes specified in the introduction in that, in accordance with the invention the application software is divided into a number of real-time software components RTSWCs, in particular into a plurality of real-time software components RTSWCs, wherein, when the application software or the real-time computer application is executed, the RTSWCs exchange or can exchange information by means of time-triggered messages, and wherein each RTSWC is allocated a time-triggered virtual machine TTVM, wherein, during a service interval SI, an operating system running on a computing node provides a TTVM realised on this computing node with protected access to the network resources and memory resources of the computing node assigned to this TTVM, and wherein, during the SI, a defined computing power for processing the RTSWCs running in the TTVM is allocated to the TTVM by the operating system of the computing node in such a way that the RTSWCs can provide a result before the end of the SI.

In a distributed real-time communication system according to the invention at least one computing node is designed in accordance with the invention, and preferably a plurality of the computing nodes or all computing nodes are designed accordingly.

In accordance with the present invention the time-correct execution of a real-time software component (RTSWC) is performed in a virtual time-triggered machine (time-triggered virtual machine TTVM), wherein the TTVM is emulated by the operating system of a computing node.

An application software, which describes the real-time computer application, consists of a number of real-time software components (RTSWCs). A real-time software component is understood to mean a component of a real-time-capable application software system, in particular a comprehensive real-time-capable application software system, which calculates the intended output data and a new inner state of the RTSWC from the provided input data and the inner state of the RTSWC within a predefined real-time interval on the precondition of a suitable runtime environment.

A distributed real-time computer system is time-triggered when the periodically recurring moment in time at which a message is to be sent from a transmitter is determined from the progression of the global time.

A time-triggered real-time computer system presupposes that the sensors, for example the intelligent sensors, and the actuators, for example the intelligent actuators, the computing nodes and the distributor units have access to a global time of known accuracy.

In a time-triggered real-time computer system there is a strict separation of data processing and data transport.

The data processing is performed by real-time software components (RTSWCs), which are executed in computing nodes.

In a time-triggered distributed real-time computer system the data transport for providing the input data of an RTSWC and for forwarding the results of an RTSWC is preferably performed via time-triggered periodic state messages, of which the sending times and receiving times are contained in schedules of the communication system established a priori.

The time interval between the sending time and the receiving time of a message is preferably selected to be at least long enough that the present communication system, in particular real-time communication system, can transport the specified real-time message from the transmitter to the receiver in this time interval. It is advantageous if this time interval is longer than this minimum interval in order to increase the flexibility of the communication system.

The access semantics to the data of a periodic state message corresponds largely to the access semantics to a variable in a programming language. During reading, the current value of the state message is adopted. Since, when a new version of a state message arrives, the old version is overwritten, there are no queues in the case of communication by means of state messages.

Whereas the progress of the physical processes in the system, i.e. the system processes, is dependent on the progression of physical time, the execution period of a real-time software component (of a computer process) is determined by the speed of the program processing in the computing node.

In a cyber-physical system the progression of the physical processes in the system must be synchronised with the computer processes running in the computing nodes.

A method for synchronising the system processes with the computer processes is based on the introduction of equidistant periodic synchronisation points. It is advantageous when the physical process is monitored at each synchronisation point by means of all available sensors, in particular intelligent sensors, simultaneously. The simultaneous monitoring of all process data ensures that time-induced changes in the process sequence do not falsify the relationships between the observed process data existing at the monitoring time.

The time interval between two successive synchronisation points is referred to as a frame. The duration of a frame is determined by the dynamics of the physical processes in the system. The dynamics of a physical process is understood to mean the maximum value of the derivation of a variable V describing the process after the time t.

In the design phase of a real-time computer system the duration D of a frame is to be selected such that, even in the extreme case of the highest dynamics of the physical process, the change D. Max/dV/dt/of a continuous process variable within a frame does not have a significant influence on the set task.

The selection of the duration of a frame will be explained on the basis of the example of an airbag trigger system in a vehicle. When a vehicle travelling at a speed of 30 m/sec (that is 108 km/h), the position of the vehicle changes in a time interval of 1 msec by 3 cm. When a frame period of 100 μsec is selected, the position change of 3 mm thus does not have a significant influence on the process sequence within a frame.

In a large real-time computer system a multiplicity of different frame durations may occur. It is advantageous when each frame duration corresponds to a power of two of a smallest frame duration, which leads to a harmonic quantity of frame durations, of which the phases can be synchronised. It may also be advantageous when an element from the quantity of the frame durations corresponds exactly to the duration of the physical second.

In a strictly frame-based system there are no inputs from a physical process to a computer process during the duration of a frame. In such a time-triggered distributed computer system there are only system-wide synchronised periodic clock interrupts, which signal the start of a new frame. In a strictly frame-based system the computer processes run uninfluenced by the physical processes in the system for the duration of a frame.

Advantageous embodiments of the methods according to the invention, of the computer system according to the invention, in particular the distributed real-time computer system, and of a computing node according to the invention, which can be realised in each case individually or in any combination, are listed hereinafter:

- a TTVM, at the start of an SI, provides the input data of an RTSWC in the form of time-triggered state data in the data region of the RTSWC and, at the end of the SI, adopts the output data of the RTSWC in the form of time-triggered state data from the data region of the RTSWC;
- a number of TTVMs are realised at the same time on a computing node;
- in a real-time computer system, in particular a comprehensive real-time computer system, there are realised a multiplicity of frames having different frame durations;
- the frame durations correspond to a power of 2 of the smallest frame duration;
- the operating system of a computing node compares the access rights of a TTVM with the access requirements of the RTSWCs running on the TTVM in order to identify security errors;
- a communication system of the real-time computer system or an operating system of a computing node deactivates the running version of an RTSWC at a switchover time scheduled a priori and activates a new version of an RTSWC on another TTVM and supplies this with communication data;
- two of the same, i.e. identical, RTSWCs run on two independent fail-silent TTVMs;
- three of the same, i.e. identical RTSWCs run on three independent TTVMs, and a receiving TTVM, i.e. a TTVM receiving three copies of a message, masks defective messages by means of majority voting;
- one or more computing nodes has/have in each case two or more processors, wherein an RTSWC is executed on two or more processors of a computing node in parallel, wherein the TTVM preferably divides the RTSWC among the available processors of the computing node, such that the computing time for the RTSWC can be reduced.

Figure 2:
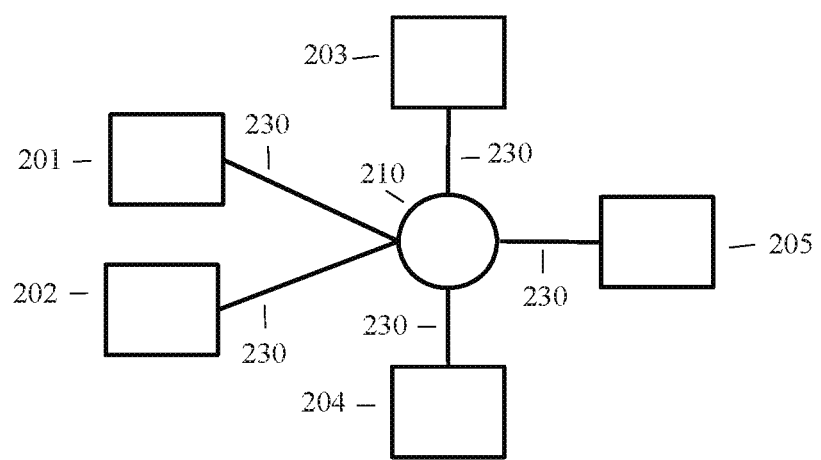
Figure 3:
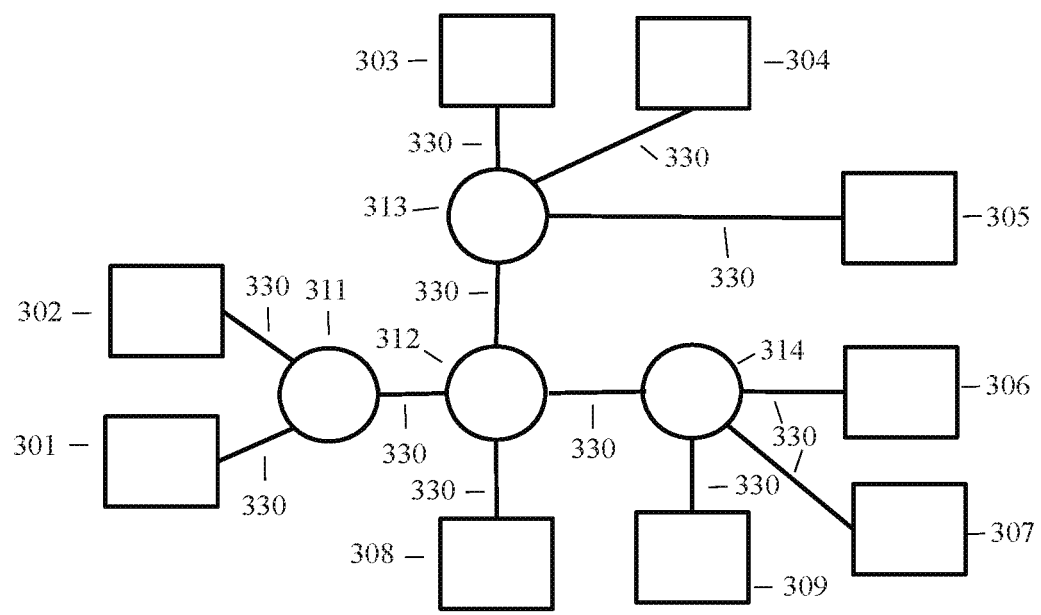

The invention will be explained hereinafter in greater detail on the basis of the drawing, in which FIG. 1 shows a typical sequence of events within a time-triggered frame, FIG. 2 by way of example shows the distributed computer hardware of a simple distributed real-time computer system, and FIG. 3 shows a more comprehensive hardware configuration of a distributed real-time computer system.

Figure 4:
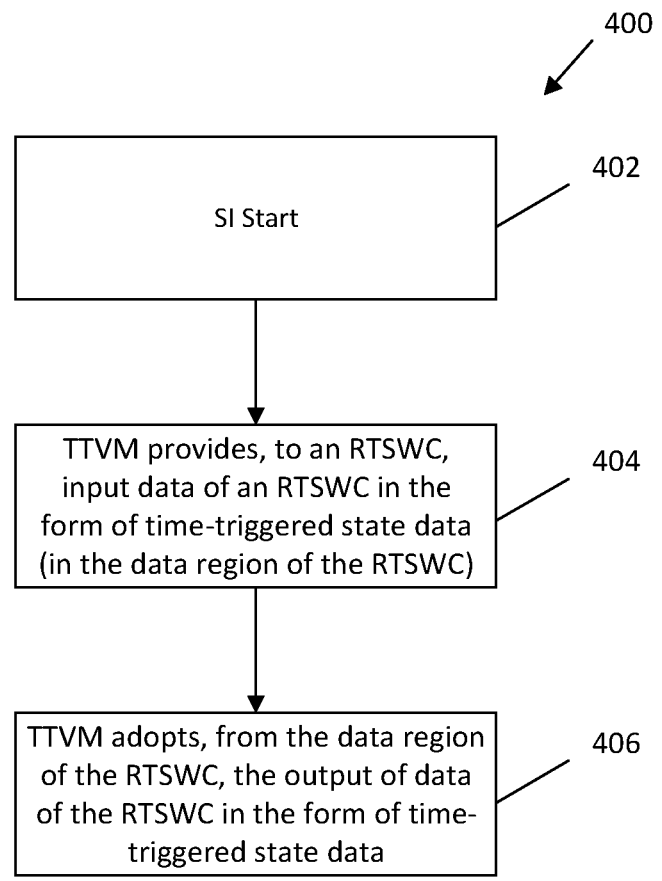

FIG. 4 is a flow diagram depicting a method according to an embodiment of the disclosure.

FIG. 1 shows a typical sequence of the events within a time-triggered frame. At the monitoring time 101, i.e. the start of a frame, which also marks the global synchronisation time, the physical process is monitored by all sensors simultaneously. In the time interval 102, i.e. the pre-processing interval, the sensor data is read out and pre-processed. At the time 103, i.e. the delivery time, the sending of the message containing the pre-processed sensor data is begun. After the transmission interval 104 predefined in the schedule, the message arrives at the time 105 in the receiving computing node, which calculates the target values during the time interval 106. At the time 107 this computing node starts to send the message containing the target values to the intelligent actuator. Following the transmission interval 108, this message arrives at the time 109 at an actuator, preferably an intelligent actuator, which after the delay interval 110 transfers the target values to the physical system at the time 111.

In the time interval 112, i.e. the interval between the completion 111 of the calculation in this frame and the start of the next frame 101, the inner state of the system is clearly defined.

In a strictly frame-based system, different sensors monitor predominantly the physical process exclusively at fixed globally synchronised monitoring times. The monitoring times are preferably synchronised with the start times of a frame.

In accordance with the present invention it is generally provided, i.e. in a manner not limited to the exemplary embodiment described in the drawings, for the time-correct execution of a real-time software component (RTSWC) to be performed in a virtual time-triggered machine (time-triggered virtual machine TTVM), wherein the TTVM is emulated by the operating system of a computing node The term emulation is understood in computing to mean the imitation of the function of one computer by another computer. The term virtualisation is understood to mean the formation of an emulated service unit by a software layer of a native operating system running in a specific hardware environment. Non-physical computer resources, such as emulated hardware, emulated operating systems, emulated data stores or emulated network resources, can be formed by means of the virtualisation. The virtualisation makes it possible to form abstract computer resources with fixed power features without reference to a specific physical runtime environment, for example an emulated operating system by a native operating system running on a specific hardware. The virtualisation has gained great economic importance, for example in the field of cloud computing.

A time-triggered virtual machine (TTVM) is an abstract service unit which is provided with emulated computer resources during a periodic real-time interval (the service interval SI) by the native operating system running in a computing node in order to execute the real-time software component (RTSWC) which was allocated to the TTVM.

The start times and the end times of the periodic service intervals SI are specified on the global time axis within the scope of the system design and relate to the times of receipt of the time-triggered messages containing the input data and the sending of the time-triggered messages containing the output data. During the SI the TTVM is given protected access by the operating system running on the specific machine to the network resources and memory resources assigned to the TTVM, and the TTVM is then allocated a defined computing power for processing the RTSWC running in the TTVM, in such a way that the intended output data can be provided by the RTSWC before the end of the SI.

In FIG. 1 the time interval 106 between the events 105 (arrival of the input data) and 107 (start of sending of the output data) corresponds to the SI interval, during which the corresponding RTSWC is executed on the TTVM within a frame.

Since the access semantics to the communication data of a TTVM, i.e. the input data and output data of the TTVM, corresponds to the access semantics of variables, the TTVM running on a component may provide the RTSWC with a uniform data interface, which comprises both the communication data and the local data. On the one hand the structure of the RTSWC is thus significantly simplified, and on the other hand the flexibility of the allocation of the RTSWC to computing nodes is significantly increased.

Within the scope of the configurations of a TTVM, the access rights to the network resources and memory resources, especially to the data regions of the computing node, are precisely predefined. The access requirements of the RTSWC are compared in an ongoing manner by the operating system with these access rights of the TTVM in order to be able to identify errors, particularly in the field of security.

The combination of an RTSWC with a TTVM forms a time-triggered service unit (TTSU). Whilst an RTSWC constitutes a construct, a TTSU is a specific thing having physical properties that can be monitored. An RTSWC may contain errors (fault states), but only one TTSU can fail.

The pairing of a TTSU with a computing node can take place dynamically, i.e. this pairing can be changed during running operation. Such a change to the pairing requires the installation of a corresponding TTVM on a new computing node and the supply of this TTVM with the necessary input data by modifying the schedules in the time-triggered distributor units of the communication system. The corresponding RTSWC is then executed on this newly installed TTVM, and the calculated output data are transported from the correspondingly newly configured communications system to the intended receivers, in particular the intelligent actuators.

The dynamic pairing of RTSWC to TTVM supports the implementation of fault tolerance, the reconfiguration and the evolution of comprehensive software systems. Such a dynamic switchover is described under consideration of FIG. 2.

FIG. 2 illustrates, by way of example, a simple distributed real-time computer system in which intelligent sensors 201, 202 detect data of a physical system at fixed globally synchronised monitoring times and send periodic time-triggered messages via communication channels 230 and a distributor unit 210 to computing nodes 203 and 204. A TTVM is available in the computing node 203 and implements the execution of an RTSWC and thus constitutes a TTSU, and sends the output data of the RTSWC to an intelligent actuator 205 via the distributor unit 210. A TTSU runs in this example on the computing node 204 and contains a new version of the RTSWC. At a switchover time scheduled a priori, the distributor unit 210 replaces the output data from the computing node 203 with output data of the computing node 204. A new software version is thus installed and activated without interruption of the running operation.

In accordance with the invention a computing node may realise a plurality of TTVMs having the same or different frame durations, which means that the computing node realises a plurality of TTSUs. In such a computing node it is advantageous when the SIs of the TTVMs do not overlap.

In FIG. 3 a more comprehensive hardware configuration than in FIG. 2 is shown, with intelligent sensors 301, 302, 303, 304, computing nodes 308, 309, on each of which one or more TTVMs are installed, and also the intelligent actuators 305, 306, 307. The intelligent sensors, actuators and computing nodes exchange time-triggered real-time messages via communication channels 330 and via distributor units 312, 313, 314.

The intelligent sensor 301, 302, 303 detect data processed on the TTVM which is first installed on the computing node 308, referred to hereinafter as TTVM1, and which calculates a target value for the intelligent actuator 305.

The intelligent sensors 302, 303, 304 detect data that is processed on a TTVM which is installed second on the computing node 308, referred to hereinafter as TTVM2, and which calculates a target value for the intelligent actuator 306.

The intelligent sensors 302, 303, 304 detect data that is processed on a TTVM which is installed third on the computing node 309, referred to hereinafter as TTVM3, and which calculates a target value for the intelligent actuator 307.

In an RTSWC the current state data detected by the remote intelligent sensors is read in exactly the same way as local data. The output data to the remote actuators is written by the time-triggered communication system (communication channels and distributor units) into the intended data regions of a TTVM and at the end of the SI is transported by the time-triggered communication system to the intended intelligent actuators. The execution of special input or output commands in the software of an RTSWC is not necessary.

When two identical RTSWCs run on two independent fail-silent TTSUs, the receiver can thus tolerate the failure of one TTSU [3].

When three identical RTSWCs run on three independent TTSUs, the receiving TTSU can thus mask the behaviour of a defective TTSU by means of majority voting.

In a real-time computer system different versions of a TTSU, for example a current operating version and a new version, can run in parallel either on one computing node or on a plurality of computing nodes. The results of the new version can be forwarded by the time-triggered communication system to a comparator, which compares the results of the new version with the results of the operating version so as to identify faults in the new version. When the new version has been sufficiently tested, it can be integrated into the running operation as described in FIG. 2.

The present invention leads to a significant simplification and versatility of a large real-time computer system and is therefore of great economic importance.

FIG. 4 depicts a method 400, in which, a TTVM, at the start of an SI 402, provides the input data of an RTSWC in the form of time-triggered state data in the data region of the RTSWC 404. At the end of the SI, the TTVM adopts the output data of the RTSWC in the form of time-triggered state data from the data region of the RTSWC 406.

The invention claimed is:

1. A method for executing a comprehensive real-time computer application on a distributed real-time computer system, which comprises a multiplicity of sensors, actuators, computing nodes and distributor units, which have access to a global time, and wherein the comprehensive real-time computer application is contained in an application software, the method comprising:

dividing the application software into a plurality of real-time software components (RTSWCs), wherein, when the application software or the comprehensive real-time computer application is executed, the RTSWCs exchange information by time-triggered messages, and wherein each RTSWC is allocated a time-triggered virtual machine (TTVM), wherein, during a service interval (SI), an operating system running on a computing node provides the TTVM executed on the computing node with protected access to network resources and memory resources of the computing node assigned to the TTVM, wherein, during the SI, a defined computing power for processing the RTSWCs running in the TTVM is allocated to the TTVM by the operating system of the computing node such that the RTSWCs provides a result before an end of the SI, wherein in the comprehensive real-time computer application, a multiplicity of frames having different frame durations are executed, and wherein the frame durations, other than a smallest frame duration, correspond to a power of 2 of the smallest frame duration.

2. The method of claim 1, wherein the TTVM, at a start of the SI, provides input data of the RTSWC in the form of time-triggered state data in a data region of the RTSWC and, at the end of the SI, adopts output data of the RTSWC in the form of the time-triggered state data from the data region of the RTSWC.

3. The method of claim 1, wherein a number of the TTVMs are executed simultaneously on the computing node.

4. The method of claim 1, wherein the operating system of the computing node compares access rights of the TTVM with access requirements of the RTSWCs running on the TTVM in order to identify security errors.

5. The method of claim 1, wherein a communication system of the distributed real-time computer system or the operating system of the computing node deactivates a running version of the RTSWC at a switchover time scheduled a priori and activates a new version of the RTSWC on another TTVM and supplies the TTVM with communication data.

6. The method of claim 1, wherein two identical RTSWCs run on two independent fail-silent TTVMs.

7. The method of claim 1, wherein three identical RTSWCs run on three independent TTVMs, and wherein a receiving TTVM receives three copies of a message from the three identical RTSWCs to mask defective messages by majority voting.

8. The method of claim 1, wherein one or more computing nodes each has two or more processors, and wherein the RTSWC is executed on two or more processors of the computing node in parallel, wherein the TTVM divides the RTSWCs among available processors of the computing node such that a computing time for the RTSWCs is reduced.

9. The method of claim 1, wherein a time interval between a sending time and a receiving time of a message is selected to be at least long enough that a real-time message is transported from a transmitter to a receiver in a minimum time interval, wherein the time interval is longer than the minimum time interval in order to increase a flexibility of a communication system.

10. A computing node for a distributed real-time computer system, which comprises a plurality of sensors, actuators, computing nodes, and distributor units, which have access to a global time, wherein a comprehensive real-time computer application or an application software is configured to be executed on the real-time computer system, wherein the application software contains the comprehensive real-time computer application, the computing node comprising:

one or more time-triggered virtual machines (TTVMs) for executing real-time software components (RTSWCs), into which the application software is divided, are configured to be executed on the computing node, wherein, when the comprehensive real-time computer application or the application software is executed, the RTSWCs exchange information by time-triggered messages, wherein, during a service interval (SI), an operating system running on the computing node provides the TTVM executed on the computing node with protected access to network resources and memory resources of the computing node assigned to the TTVM, wherein, during the SI, a defined computing power for processing the RTSWCs running in the TTVM is allocated to the TTVM by the operating system of the computing node such that the RTSWCs provide a result before an end of the SI, wherein in the comprehensive real-time computer application, a multiplicity of frames having different frame durations are executed, and wherein the frame durations, other than a smallest frame duration, correspond to a power of 2 of the smallest frame duration.

11. A real-time computer system comprising one or more computing nodes according to claim 10.

* * * * *